US008265666B2

(12) United States Patent
Song

(10) Patent No.: US 8,265,666 B2
(45) Date of Patent: *Sep. 11, 2012

(54) METHOD FOR CODING AND TRANSMITTING TRANSPORT FORMAT COMBINATION INDICATOR

(75) Inventor: Young Joon Song, Kyonggi-do (KR)

(73) Assignee: LG Electronics Inc., Seoul (KR)

( * ) Notice: Subject to any disclaimer, the term of this patent is extended or adjusted under 35 U.S.C. 154(b) by 667 days.

This patent is subject to a terminal disclaimer.

(21) Appl. No.: 12/399,383

(22) Filed: Mar. 6, 2009

(65) Prior Publication Data

US 2009/0168740 A1    Jul. 2, 2009

Related U.S. Application Data

(63) Continuation of application No. 10/950,788, filed on Sep. 28, 2004, now Pat. No. 7,526,299, which is a continuation of application No. 09/714,439, filed on Nov. 17, 2000, now Pat. No. 6,813,506.

(30) Foreign Application Priority Data

Nov. 18, 1999   (KR) ................... 1999-51361
Nov. 23, 1999   (KR) ................... 1999-52138
Feb. 3, 2000    (KR) ................... 2000-5446

(51) Int. Cl.
    H04W 4/00    (2009.01)

(52) U.S. Cl. ............. 455/466; 455/403; 455/422.1; 455/450

(58) Field of Classification Search ........... 455/403, 455/422.1, 450, 466
See application file for complete search history.

(56) References Cited

U.S. PATENT DOCUMENTS

| 6,202,189 | B1 * | 3/2001 | Hinedi et al. ............... 714/786 |
| 6,356,925 | B1 * | 3/2002 | Waltermann ................ 708/212 |
| 6,510,137 | B1 * | 1/2003 | Belaiche ..................... 370/232 |
| 6,646,993 | B1 * | 11/2003 | Davies et al. ............... 370/252 |
| 6,693,952 | B1 * | 2/2004 | Chuah et al. ................ 375/140 |
| 6,813,506 | B1 * | 11/2004 | Song .......................... 455/466 |
| 7,054,296 | B1 | 5/2006 | Sorrells et al. .............. 370/338 |
| 7,526,299 | B2 * | 4/2009 | Song .......................... 455/466 |
| 2002/0108090 | A1 * | 8/2002 | Ariel et al. .................. 714/792 |
| 2003/0035467 | A1 * | 2/2003 | Shimizu ...................... 375/147 |
| 2003/0076799 | A1 * | 4/2003 | Kwak et al. ................. 370/335 |
| 2003/0088819 | A1 | 5/2003 | Uga ............................ 714/752 |
| 2004/0028071 | A1 | 2/2004 | Gehring et al. ............. 370/442 |
| 2004/0101071 | A1 | 5/2004 | Naito .......................... 375/340 |

OTHER PUBLICATIONS

Samsung; "Text Proposal Regarding TFCI Coding for FDD", TSG-RAN Working Group 1 Meeting #7, TSGR1#7(99)b62; Hanover, Germany; Aug. 30-Sep. 3, 1999; (XP-002344344).
European Search Report dated Aug. 20, 2009.
United States Office Action dated Dec. 28, 2011 issued in U.S. Appl. No. 12/399,422.
United States Notice of Allowance dated Jul. 10, 2012 issued in U.S. Appl. No. 12/399,422.

* cited by examiner

Primary Examiner — Patrick Edouard
Assistant Examiner — Matthew Genack
(74) Attorney, Agent, or Firm — KED & Associates LLP

(57) ABSTRACT

A method and matrixes for transmitting an transport format combination indicator is disclosed. The matrixes according to the invention comprising five column vectors of 32 elements of binary code derived from OVSF codes which are to be multiplied to the lower bits of a TFCI and one column vector of 32 elements of 1 when (32,6) codes are used.

6 Claims, 14 Drawing Sheets

FIG.6

$$X = \begin{bmatrix} X_1 \\ X_2 \\ X_3 \\ X_4 \\ X_5 \\ X_6 \\ X_7 \\ X_8 \\ X_9 \\ X_{10} \end{bmatrix} = \begin{bmatrix} 0 & 0 & 0 & 0 & 0 & a_0 & 0 & 0 & 0 & 0 \\ 0 & 0 & 0 & 0 & a_1 & a_0 & 0 & 0 & 0 & 0 \\ 0 & 0 & 0 & a_2 & a_1 & a_0 & 0 & 0 & 0 & 0 \\ 0 & 0 & a_3 & a_2 & a_1 & a_0 & 0 & 0 & 0 & 0 \\ 0 & a_4 & a_3 & a_2 & a_1 & a_0 & 0 & 0 & 0 & 0 \\ a_5 & a_4 & a_3 & a_2 & a_1 & a_0 & 0 & 0 & 0 & 0 \\ a_5 & a_4 & a_3 & a_2 & a_1 & a_0 & a_6 & 0 & 0 & 0 \\ a_5 & a_4 & a_3 & a_2 & a_1 & a_0 & a_6 & a_7 & 0 & 0 \\ a_5 & a_4 & a_3 & a_2 & a_1 & a_0 & a_6 & a_7 & a_8 & 0 \\ a_5 & a_4 & a_3 & a_2 & a_1 & a_0 & a_6 & a_7 & a_8 & a_9 \end{bmatrix}$$

METHOD FOR CODING AND TRANSMITTING TRANSPORT FORMAT COMBINATION INDICATOR

CROSS-REFERENCE TO RELATED APPLICATIONS

This application is a Continuation Application of prior U.S. patent application Ser. No. 10/950,788 filed Sep. 28, 2004, now U.S. Pat. No. 7,526,299 which is a Continuation Application of Ser. No. 09/714,439 filed on Nov. 17, 2000, now U.S. Pat. No. 6,813,506 which claims priority under 35 U.S.C. §119 to Korean Application Nos. 1999-51361 filed on Nov. 18, 1999, 1999/52138 filed on Nov. 23, 1999 and 2000/5446 filed on Feb. 3, 2000, whose entire disclosures are hereby incorporated by reference.

BACKGROUND

1. Field

The present invention relates to a mobile telecommunication of third generation, and more particularly to a method for transmitting a transport format combination indicator (TFCI) inserted to each time slot of a radio frame in a mobile telecommunication system using a W-CDMA standard.

2. Background

Generally, a Third Generation Partnership Project (3GPP) group describes a definition of a physical channel of an upward link and a downward link of Radio Access Network (RAN). Here, a Dedicated Physical Channel (DPCH) comprises three-layer structure of super frames, radio frames and time slots. FIGS. 1 and 2 show two data structures of the DPCH. The first type is a Dedicated Physical Data Channel (DPDCH) for transferring dedicated data, and the second type is a Dedicated Control Channel (DPCCH) for transferring a control information.

FIG. 1 shows a data structure of an upward link DPCH according to the standard of 3GPP RAN, while FIG. 2 shows a data structure of a downward link DPCH. In FIGS. 1 and 2, the DPCCH includes a TFCI field in each time slot constituting a radio frame. In other words, information on a transmission format, i.e. TFCI, is coded and inserted into each radio frame.

The coding of the TFCI bits according to the 3GPP standard will next be explained.

The number of TFCI bits is variable from a minimum of 1 bit to a maximum of 10 bits, and the number of bits is determined from the point in time when a call starts through a signal processing of an upper layer. Different coding methods are applicable to the TFCI depending upon the number of bits. When the number of TFCI bits is less than 6, a bi-orthogonal coding or a first Reed-Muller coding is applicable. When the number of the TFCI bits is greater than 7, a second Reed-Muller coding is applicable. According to the 3GPP standard, the coded TFCI undergoes a puncturing to generate a code word of 30 bit length.

For example, when the number of TFCI bits, determined by upper layer signaling, is less than 6, a TFCI code word is output through a bi-orthogonal coding. Here, a (32, 6) coding is applicable to the bi-orthogonal coding. For that purpose, if the TFCI consists of less than 6 bits, a padding procedure is first executed to supplement the deficient bit value with "0" from the Most Significant Bit (MSB). Thereafter, the TFCI code word is inserted into each time slot of a radio frame by two bits. However, the entire length is restricted to be 30 bits. Thus, the TFCI code word of 32 bits, which has been bi-orthogonal coded, is punctured by 2 bits and inserted into each time slot.

In another example, when the number of TFCI bits determined by upper layer signaling not more than 10 bits, a TFCI code word is output through a second Reed-Muller coding. Here, a (32, 10) coding is applicable to the second Reed-Muller coding. For that purpose, if the TFCI bits are less than 10, a padding procedure is first executed to supplement the deficient bits with "0" from the MSB. The Reed-Muller coded TFCI code word is referred to as a sub-code. Accordingly, the sub-code is punctured by 2 bits to also generate a TFCI code word of 30 bit length. FIG. 3 is a block diagram illustrating a channel coding process.

The code word of 30 bit length generated as described above is divided into fifteen 2-bits and inserted into each time slot for transfer. FIG. 4 is a diagram showing a typical insertion of the coded TFCI code word into each time slot.

Also, FIG. 5 is a diagram illustrating an encoding structure for generating a (32, 10) TFCI code word according to the conventional second Reed-Muller coding. Referring to FIG. 5, the TFCI bits, variable from 1 to 10 bits are input to an encoder. The input data bit is lineally combined with 10 basis sequences. Namely, the basis sequences (32 element vectors) used for the linear combination comprises of a uniform code, in which all bit values are "1"; five orthogonal variable spreading factor codes represented by {C32, 1, C32, 2, C32, 4, C32, 8, C32, 16} as shown in Table 1; and four mask codes represented by {Mask1, Mask2, Mask3, Mask4} as shown in Table 2. In the conventional second Reed-Muller coding, the four mask codes are used to increase the number of code word by 16 times.

TABLE 1

| | |
|---|---|
| C32, 1 | 0000 0000 0000 0000 1111 1111 1111 1111 |
| C32, 2 | 0000 0000 1111 1111 0000 0000 1111 1111 |
| C32, 4 | 0000 1111 0000 1111 0000 1111 0000 1111 |
| C32, 8 | 0011 0011 0011 0011 0011 0011 0011 0011 |
| C32, 16 | 0101 0101 0101 0101 0101 0101 0101 0101 |

TABLE 2

| | |
|---|---|
| Mask1 | 0010 1000 0110 0011 1111 0000 0111 0111 |
| Mask2 | 0000 0011 1100 1101 0110 1101 1100 0111 |
| Mask3 | 0000 1010 1111 1001 0001 1011 0010 1011 |
| Mask4 | 0001 1100 0011 0111 0010 1111 0101 0001 |

Table 3 below shows the prior basis sequences, in which $M_{i,0}$ is the uniform code; $M_{i,1}$~$M_{i,5}$ respectively corresponds to $C_{32,1}$, $C_{32,2}$, $C_{32,4}$, $C_{32,8}$, and $C_{32,16}$; and $M_{i,6}$~$M_{i,9}$ respectively corresponds to Mask1~Mask4.

TABLE 3

| i | $M_{i,0}$ | $M_{i,1}$ | $M_{i,2}$ | $M_{i,3}$ | $M_{i,4}$ | $M_{i,5}$ | $M_{i,6}$ | $M_{i,7}$ | $M_{i,8}$ | $M_{i,9}$ |
|---|---|---|---|---|---|---|---|---|---|---|
| 0 | 1 | 0 | 0 | 0 | 0 | 0 | 0 | 0 | 0 | 0 |
| 1 | 1 | 0 | 0 | 0 | 0 | 1 | 0 | 0 | 0 | 0 |
| 2 | 1 | 0 | 0 | 0 | 1 | 0 | 1 | 0 | 0 | 0 |
| 3 | 1 | 0 | 0 | 0 | 1 | 1 | 0 | 0 | 0 | 1 |
| 4 | 1 | 0 | 0 | 1 | 0 | 0 | 1 | 0 | 1 | 1 |
| 5 | 1 | 0 | 0 | 1 | 0 | 1 | 0 | 0 | 0 | 1 |
| 6 | 1 | 0 | 0 | 1 | 1 | 0 | 0 | 0 | 1 | 0 |
| 7 | 1 | 0 | 0 | 1 | 1 | 1 | 0 | 1 | 0 | 0 |
| 8 | 1 | 0 | 1 | 0 | 0 | 0 | 0 | 1 | 1 | 0 |
| 9 | 1 | 0 | 1 | 0 | 0 | 1 | 1 | 1 | 1 | 0 |
| 10 | 1 | 0 | 1 | 0 | 1 | 0 | 1 | 0 | 1 | 1 |
| 11 | 1 | 0 | 1 | 0 | 1 | 1 | 0 | 0 | 1 | 1 |

TABLE 3-continued

| i | $M_{i,0}$ | $M_{i,1}$ | $M_{i,2}$ | $M_{i,3}$ | $M_{i,4}$ | $M_{i,5}$ | $M_{i,6}$ | $M_{i,7}$ | $M_{i,8}$ | $M_{i,9}$ |
|---|---|---|---|---|---|---|---|---|---|---|
| 12 | 1 | 0 | 1 | 1 | 0 | 0 | 0 | 1 | 1 | 0 |
| 13 | 1 | 0 | 1 | 1 | 0 | 1 | 0 | 1 | 0 | 1 |
| 14 | 1 | 0 | 1 | 1 | 1 | 0 | 1 | 0 | 0 | 1 |
| 15 | 1 | 0 | 1 | 1 | 1 | 1 | 1 | 1 | 1 | 1 |
| 16 | 1 | 1 | 0 | 0 | 0 | 0 | 1 | 0 | 0 | 0 |
| 17 | 1 | 1 | 0 | 0 | 0 | 1 | 1 | 1 | 0 | 0 |
| 18 | 1 | 1 | 0 | 0 | 1 | 0 | 1 | 1 | 0 | 1 |
| 19 | 1 | 1 | 0 | 0 | 1 | 1 | 1 | 0 | 1 | 0 |
| 20 | 1 | 1 | 0 | 1 | 0 | 0 | 0 | 1 | 1 | 1 |
| 21 | 1 | 1 | 0 | 1 | 0 | 1 | 0 | 1 | 0 | 1 |
| 22 | 1 | 1 | 0 | 1 | 1 | 0 | 0 | 0 | 1 | 1 |
| 23 | 1 | 1 | 0 | 1 | 1 | 1 | 0 | 1 | 1 | 1 |
| 24 | 1 | 1 | 1 | 0 | 0 | 0 | 0 | 1 | 0 | 0 |
| 25 | 1 | 1 | 1 | 0 | 0 | 1 | 1 | 1 | 0 | 1 |
| 26 | 1 | 1 | 1 | 0 | 1 | 0 | 1 | 0 | 1 | 0 |
| 27 | 1 | 1 | 1 | 0 | 1 | 1 | 1 | 0 | 0 | 1 |
| 28 | 1 | 1 | 1 | 1 | 0 | 0 | 0 | 0 | 1 | 0 |
| 29 | 1 | 1 | 1 | 1 | 0 | 1 | 1 | 1 | 0 | 0 |
| 30 | 1 | 1 | 1 | 1 | 1 | 0 | 1 | 1 | 1 | 0 |
| 31 | 1 | 1 | 1 | 1 | 1 | 1 | 1 | 1 | 1 | 1 |

The TFCI bits are lineally combined with the basis sequences described above and can be expressed by Equation 1, in which $a_0$ represents the Least Significant Bit (LSB), while $a_{n-1}$ represents the MSB.

$$a_{n-1}, a_{n-2}, \ldots, a_1, a_0 (n\#10) \quad \text{[Equation 1]}$$

A TFCI code word of 30 bit length is subsequently output by puncturing the first and the $17^{th}$ bits from the (32, 10) sub-code generated by the linear combination. The output TFCI code word of 30 bit length can be expressed by Equation 2:

$$b_0, b_1, b_2 \ldots, b_{28}, b_{29} \quad \text{[Equation 2]}$$

Namely, the TFCI bits are input as expressed by Equation 1 are encoded by Equation 3 below to output the TFCI code word as expressed by Equation 2:

$$b_i = \Sigma(a_n \times M_{i,n}) \bmod 2 \text{ (from n=0 to n=9, where i=0, 2, \ldots, 31)} \quad \text{[Equation 3]}$$

However, the TFCI encoding according to the technology in the related art as described above poses the following problems. First, the pattern of the TFCI bits input for encoding are improper because of the padding procedure necessary when the TFCI bits are input for coding. Particularly, when the TFCI bits for coding is less than 10, a padding procedure is typically executed to supplement the deficient bit values with "0" from the MSB. Therefore, a complex decoding procedure is necessary to decode the encoded and transmitted TFCI code words at a receiving party. Namely, a bi-orthogonal coding is necessary even when the input TFCI bits is less than 6. Thus, the receiving party needs to perform a priority check to confirm from which set the OVSF code, used for the encoding, has been selected between two OVSF code sets which are in binary complement relations. As a result, additional process and hardware are required.

Also, when two bits are punctured to generate a (30, 10) TFCI code word, inserted and transmitted to the actual TFCI field from the (32, 10) code word, a minimum hamming distance loss is up to 2 at maximum. Furthermore, although not explained above, one bit is punctured in a (16, 5) code word to generate a (15, 5) TFCI code word. In such case, a minimum hamming distance loss also occurs.

SUMMARY OF THE INVENTION

Accordingly, an object of the present invention is to solve at least the problems and disadvantages of the related art.

Particularly, an object of the present invention is to allow an easy decoding of TFCI in a mobile telecommunication system of the third generation under a W-CDMA standard.

Another object of the present invention to provide an optimal matrix for basis sequences for TFCI coding.

A still another object of the present invention to provide a method for encoding the TFCI with an optimal matrix for basis sequences.

A further object of the present invention to provide an optimal matrix for basis sequences for TFCI coding which can maximize a minimum hamming distance with respect to a TFCI code word when inserting one or two bits into each time slot and transmitting after puncturing the TFCI code word used in the mobile telecommunication system under the W-CDMA standard.

A still further object of the present invention to provide a method for encoding the TFCI with an optimal matrix for basis sequences which can maximize a minimum hamming distance with respect to a TFCI code word when inserting one or two bits into each time slot and transmitting after puncturing the TFCI code word used in the mobile telecommunication system under the W-CDMA standard.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

To achieve the objects and in accordance with the purposes of the invention, as embodied and broadly described herein, two optimal basis sequences for TFCI code are disclosed.

If the TFCI is not more than 10 bits, it is padded with zeros to 10 bits by setting the most significant bits to zero if the bits are less than 10. The resultant 10 bit TFCI is encoded by the (32,10) sub-code of second order Reed-Muller code. The transmitted code words are linearly combined with 10 basis sequences: $\{M_0, M_1, Y, M_9\}$. The basis sequences are linearly combined with TFCI bits as $M_0$ to the least significant bit and $M_9$ to the most significant bit.

One of the basis sequences of the present invention is as follows: $\{M_0 = (\text{All } 1=s), M_1 = C_{32,16}, M_2 = C_{32,8}, M_3 = C_{32,4}, M_4 = C_{32,2}, M_5 = C_{32,1}, M_6 = \text{Mask1}, M_7 = \text{Mask2}, M_8 = \text{Mask3}, M_9 = \text{Mask4}\}$. With this basis sequence, the TFCI coding scheme for Wide-band Code Divisional Multiple Access Frequency Division Duplex (W-CDMA FDD) standard achieve more diversity gain in fading channel, which results in 0.5-2.5 dB gain in case of 2-5 bits length TFCI.

An alternate basis sequences of the present invention is as follows: $\{M_0 = C_{32,16}, M_1 = C_{32,8}, M_2 = C_{32,4}, M_3 = C_{32,2}, M_4 = C_{32,1}, M_5 = (\text{All } 1=s), M_6 = \text{Mask1}, M_7 = \text{Mask2}, M_8 = \text{Mask3}, M_9 = \text{Mask4}\}$. With this basis sequence, the TFCI coding scheme for FDD standard achieves almost the same diversity gain as that of the former.

Since the basis of OVSF codes $C_{32,1}, C_{32,2}, C_{32,4}, C_{32,8}, C_{32,16}$ correspond to that of Hadamard codes $H_{5,16}, H_{5,8}, H_{5,4}, H_{5,2}, H_{5,1}$ of length $2^5=32$, optimizing the input pattern is equivalent to exchanging the basis codes from ($M_0$=all 1 s, $M_1 = C_{32,1}, M_2 = C_{32,2}, M_3 = C_{32,4}, M_4 = C_{32,8}, M_5 = C_{32,16}, M_6, M_7, M_8, M_9$) to ($M_0 = H_{5,1} = C_{32,16}, M_1 = H_{5,2} = C_{32,8}, M_2 = H_{5,4} = C_{32,4}, M_3 = H_{5,8} = C_{32,2}, M_4 = H_{5,16} = C_{32,1}, M_5$=all 1 s, $M_6, M_7, M_8, M_9$).

Therefore, a method according to the present invention for encoding the TFCI comprises determining the number of TFCI bits; Repeating $a_0$ 32 times for coding, if the TFCI consist of 1 bit; and linearly mapping the TFCI information bits $a_0, a_1, a_2, a_3, a_4, a_5, a_6, a_7, a_8, a_9$ ($a_0$ is LSB and $a_9$ is MSB) to the basis sequences, if the TFCI consist of more than 2 bits.

A method according to the present invention for encoding TFCI in split mode comprises determining the number of TFCI bits; Repeating $a_0$ 16 times for coding, if the TFCI consist of 1 bit; and linearly mapping the TFCI information bits $a_0, a_1, a_2, a_3, a_4$ ($a_0$ is LSB and $a_4$ is MSB) to the basis sequences, if the TFCI consist of more than 2 bits.

BRIEF DESCRIPTION OF THE DRAWINGS

The invention will be described in detail with reference to the following drawings in which like reference numerals refer to like elements wherein:

FIG. 6 is a diagram illustrating converted patterns of TFCI bits when the concept of present invention is applied to a conventional TFCI encoder;

DETAILED DESCRIPTION

Reference will now be made in detail to the present invention, examples of which are illustrated in the accompanying drawings. In the following description, well-known functions or constructions are not described in detail.

In the past, bi-orthogonal coding, which is the first order Reed-Muller coding, and the second order Reed-Muller coding were applicable according to the number of the TFCI bits input for the TFCI encoding. In the present invention, when the number of bits of the input TFCI bits is less than 6, the bit patterns shown in FIG. 6 is applied so that only an OVSF coding rather than the bi-orthogonal coding can be applicable. Bit patterns different from the conventional bit patterns are also applied when the number of bits of the TFCI bits is greater than 6, depending on the cases.

Figure 1:
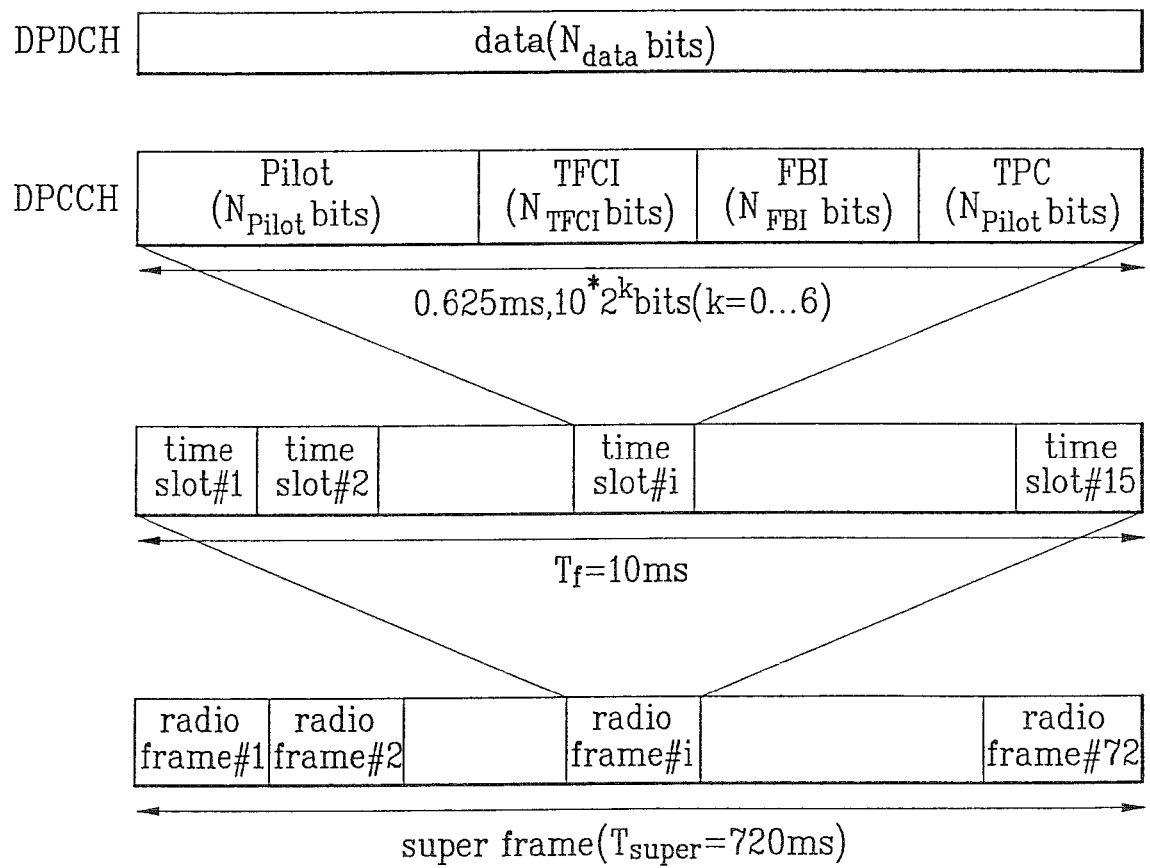
FIG. 1 is a diagram illustrating a structure of an upward link DPCH in accordance with a 3GPP RAN standard in the related art.
Figure 2:
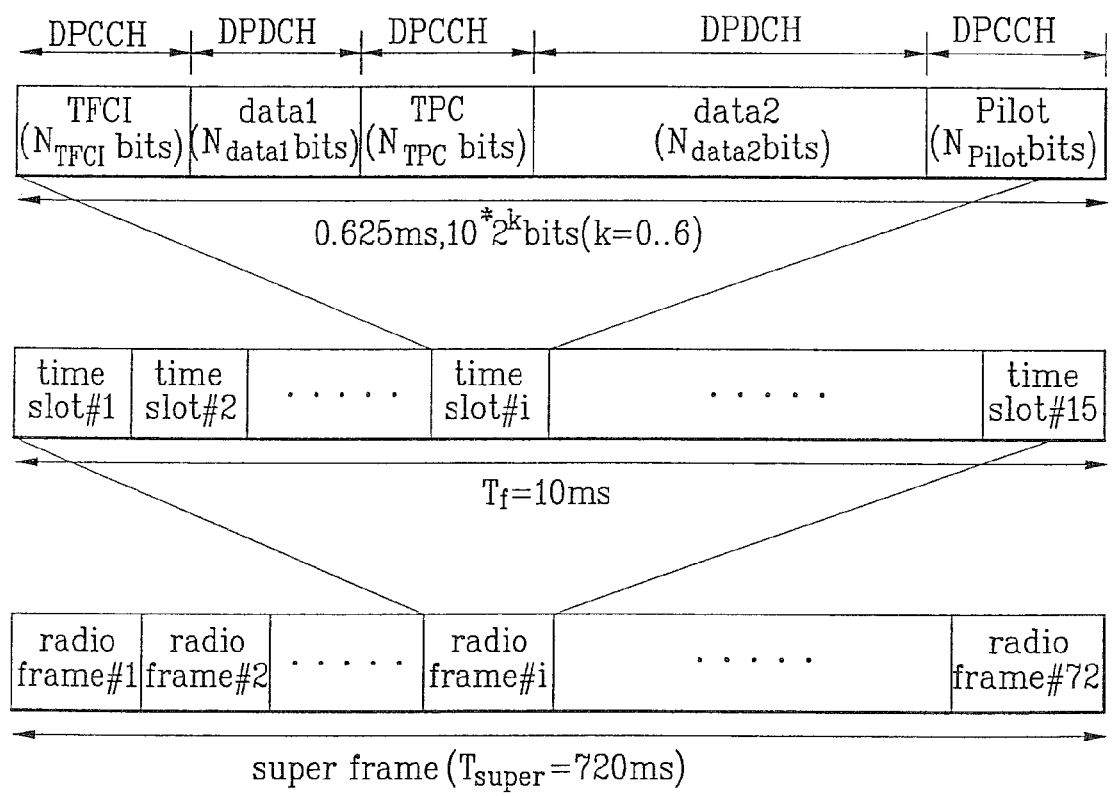
FIG. 2 is a diagram illustrating a structure of a downward link DPCH in accordance with the 3GPP RAN standard in the related art.
Figure 3:
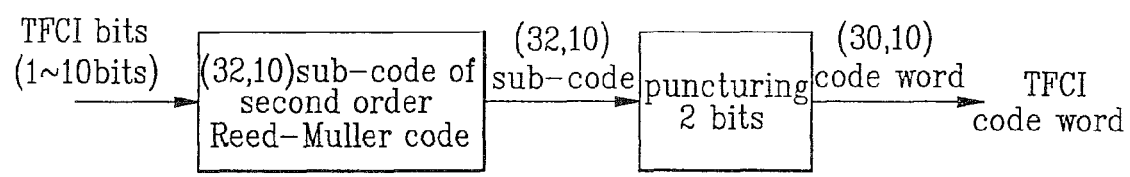
FIG. 3 is a block diagram illustrating a channel coding with respect to TFCI bits in the related art.
Figure 4:
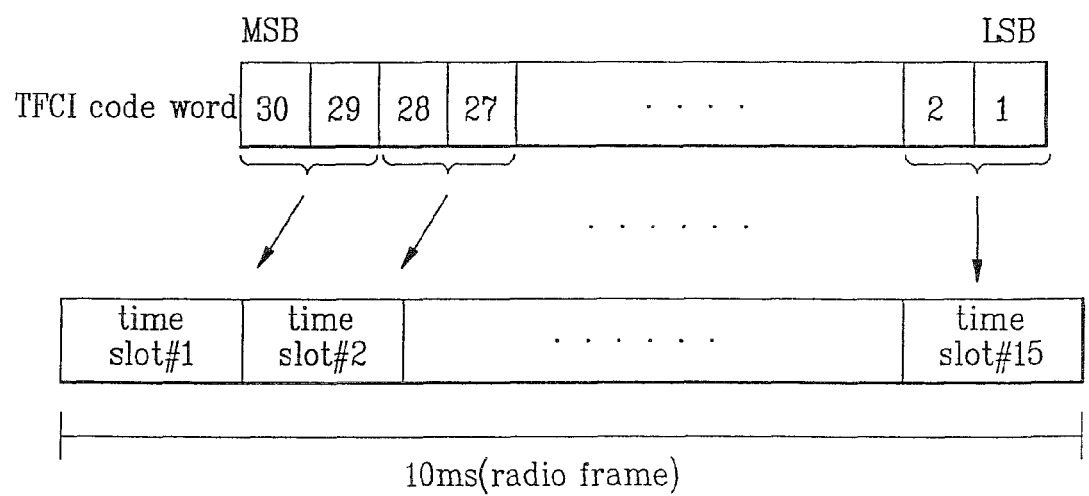
FIG. 4 is a diagram illustrating an insertion of a coded TFCI code word into each time slot in the related art.
Figure 5:
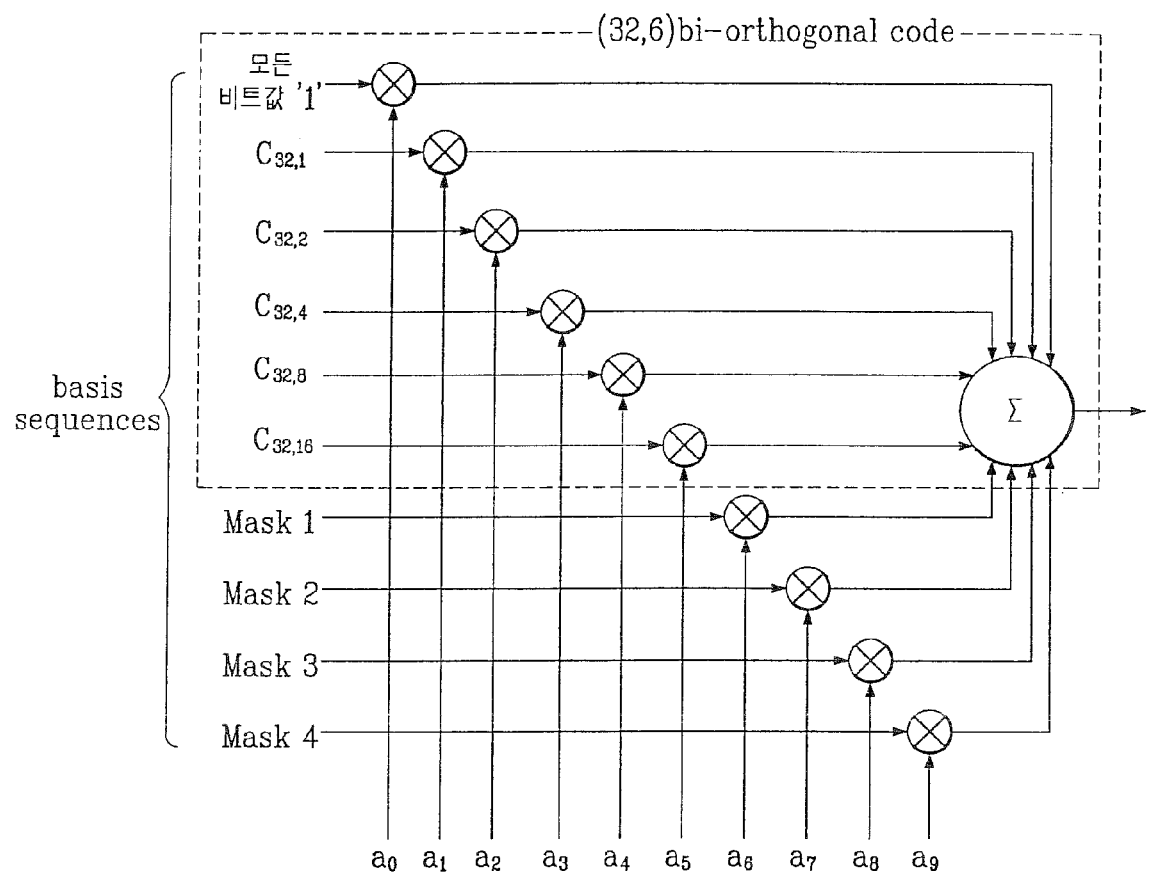
FIG. 5 is a diagram illustrating a conventional structure of an encoder for generating a (32, 10) TFCI code word by the conventional second order Reed-Muller coding.
Figure 7:
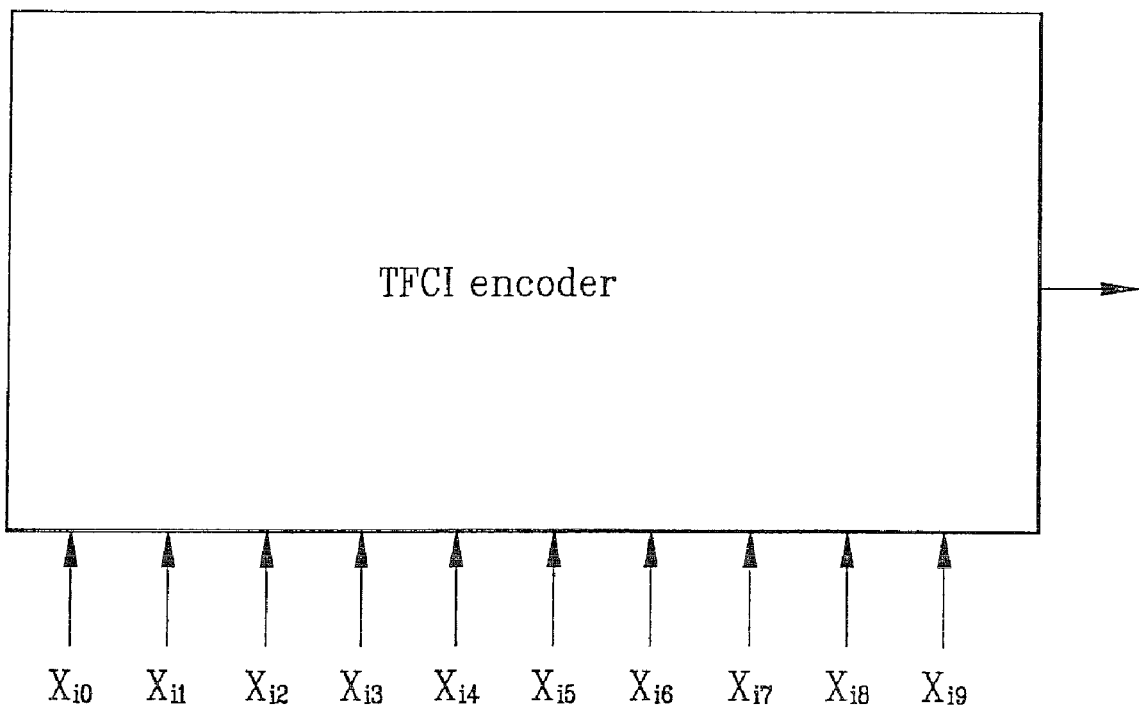
FIG. 7 is a diagram illustrating a structure of the conventional TFCI encoder, to which the converted TFCI bit patterns according to the present invention are applicable.

FIG. 6 is a pattern of TFCI bits applicable to the TFCI encoding according to the present invention and FIG. 7 is a diagram illustrating a structure of the conventional TFCI encoder, to which the TFCI bit patterns according to the present invention are applicable.

Referring to FIG. 6, when the input TFCI bits are less than 6, a bit pattern in which the deficient bit values has been supplemented with "0" from the MSB ($a_5$), unlike the prior bit pattern, and has been barrel-shifted becomes an input of the TFCI encoding to perform the OVSF coding without the bi-orthogonal coding. Also, when the number of the input TFCI bits is greater than 6, a barrel-shifted bit pattern of the prior bit pattern for 6 bits of the lower side, while the same bit pattern as the prior bit pattern is input to the 4 bits of the upper side (the TFCI bits linearly combined with the mask code of the basis sequences).

Figure 8:
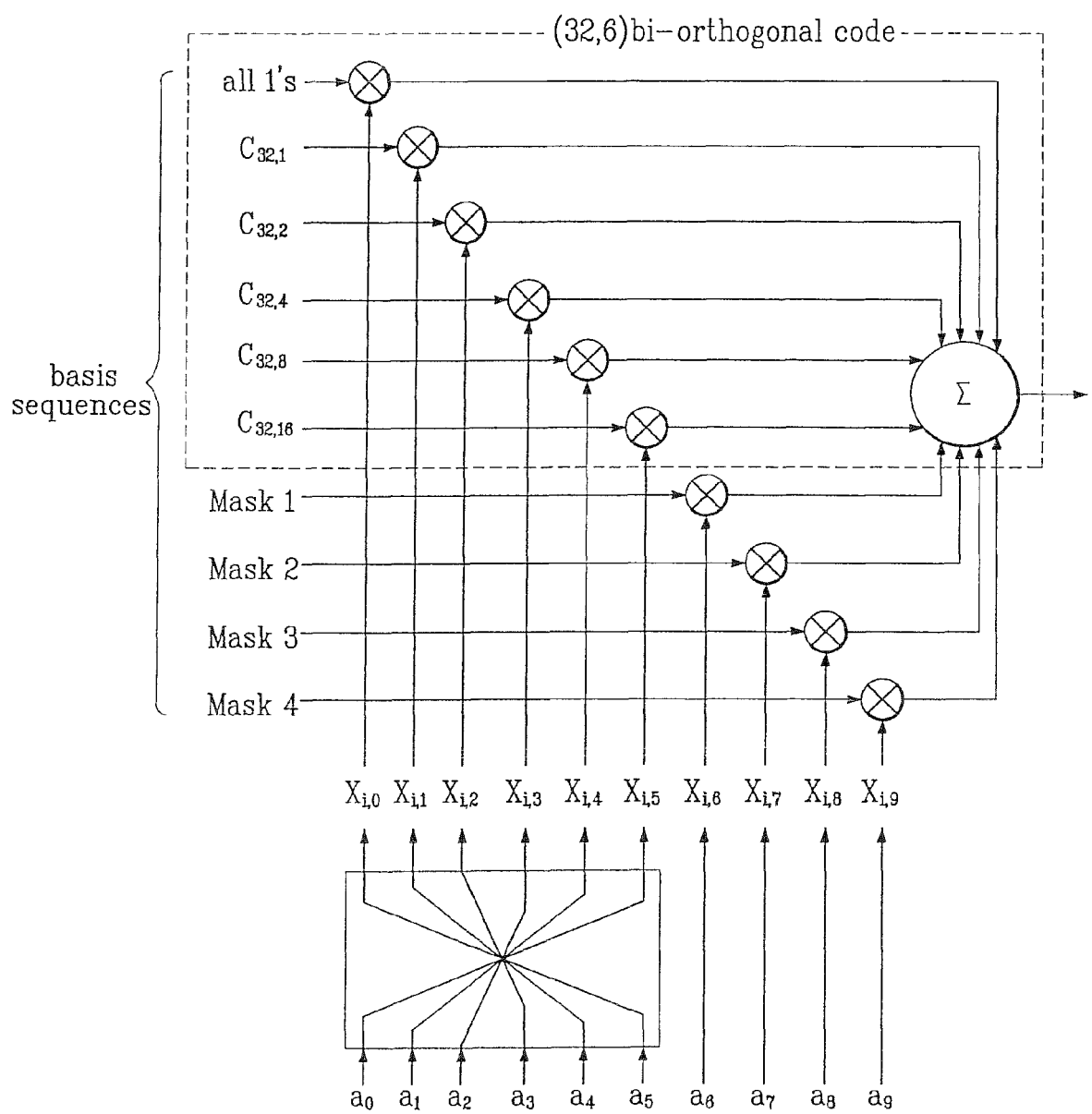
FIG. 8 is a diagram illustrating a detailed structure of the conventional TFCI encoder when the TFCI bits according to the present invention is applicable.
Figure 9:
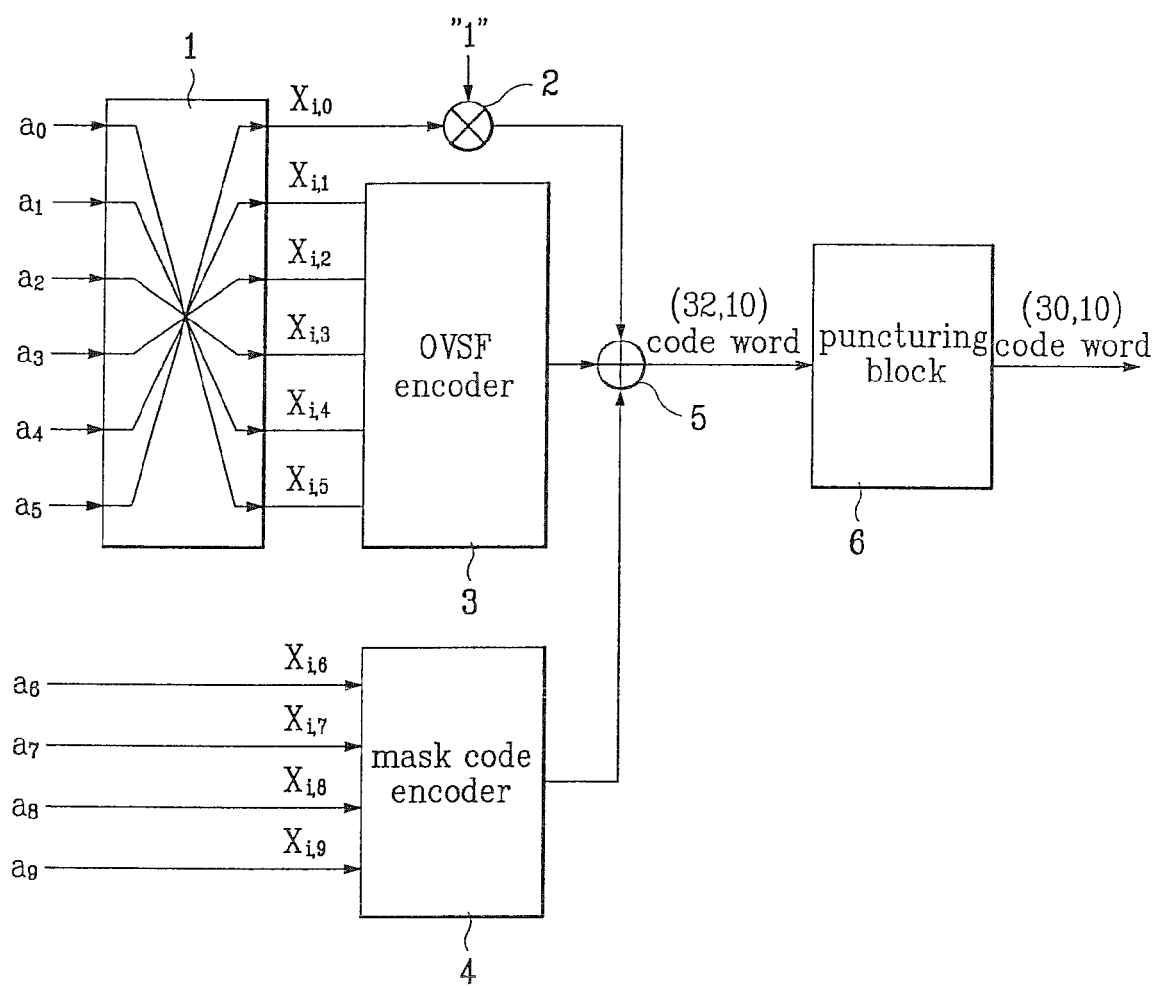
FIG. 9 is a block diagram illustrating the conventional TFCI encoder of FIG. 8.

FIGS. 8 and 9 show the construction of hardware for performing the TFCI encoding, to which the bit pattern of FIG. 6 is applied. Namely, FIG. 8 is a diagram illustrating a detailed structure of the conventional TFCI encoder when the exchanged TFCI bits of FIG. 6 according to the present invention is applicable, and FIG. 9 is a block diagram illustrating the structure of TFCI encoder when the TFCI bits pattern of FIG. 6 is applied according to the present invention. As shown in FIGS. 8 and 9, when the number of bits of the input TFCI bits is less than 6, a simple hardware has been added to allow the OVSF encoding.

In short, the TFCI bit patterns input to the TFCI encoder as shown in FIG. 7 can be expressed by Equation 4, where $X_i$ represents an aggregate composed of ten elements input to the TFCI encoder, i.e. a vector representing each TFCI bits. Here, FIG. 6 is one of a detailed pattern expressed by the Equation 4.

$$X_i = [x_{i,0}, x_{i,1}, \ldots x_{i,j}, \ldots x_{i,9}] \text{ (where, } 1 \leq i \leq 10, \text{ and } 0 \leq j \leq 9)$$ [Equation 4]

In the TFCI bit patterns applicable to the TFCI encoder according to the present invention, the TFCI encoder performs coding as follows with respect to each input. First, when the number of bits of the TFCI determined by the upper layer is less than 6, the OVSF coding is performed. Second, when the number of bits of the TFCI determined by the upper layer is 6, the bi-orthogonal coding, which is the first order Reed-Muller coding, is performed. Third, when the number of bits of the TFCI determined by the upper layer is greater than 6, the second order Reed-Muller coding is performed. The TFCI code word generated by the above coding in accordance with the number of input bits of each TFCI is transmitted to the receiving party. The receiving party then decodes the same.

The decoding performed by the receiving party with respect to the TFCI code word will next be described below.

Figure 10A:
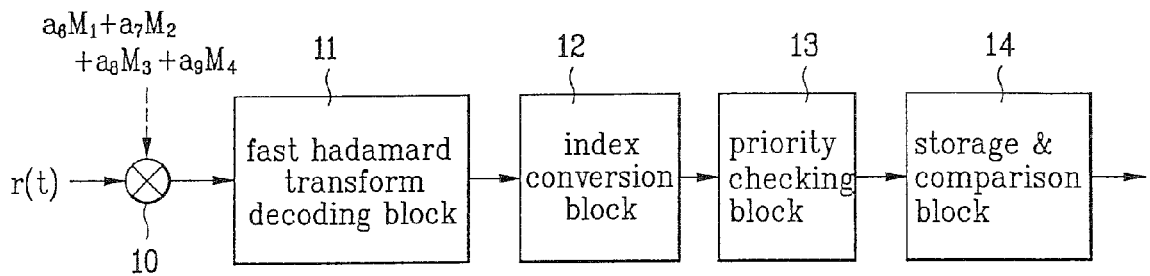
FIGS. 10a to 10c are diagrams illustrating structures of a decoder in accordance with the number of input bits of the TFCI bits according to the present invention.
Figure 10B:
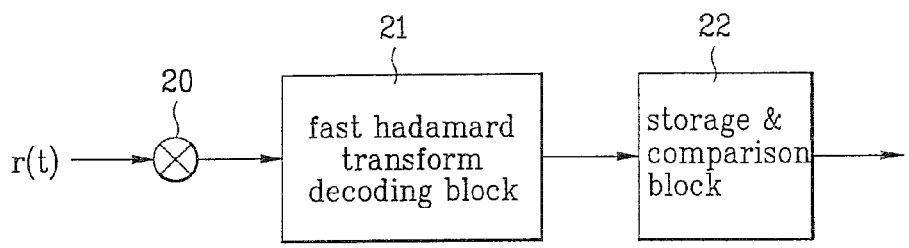
Figure 10C:
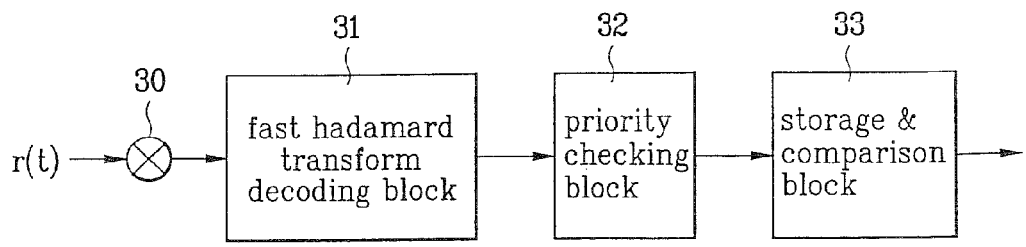

According to the present invention, an OVSF coding is directly performed without the bi-orthogonal coding when the number of bits of the input TFCI bits is less than 6. Thus, the receiving party need not undergo a priority check to detect the set to which the OVSF code used for the encoding belongs from the two OVSF code sets that are in binary complement relations. FIG. 10a to 10c are diagrams illustrating structures of a decoder in accordance with the number of input bits of the TFCI according to the present invention.

FIG. 10a shows a structure of a decoder according to the present invention when the number of input bits of the TFCI is greater than 6.

The receiving party first multiplies the TFCI code word r(t) by "$a_6M_1+a_7M_2+a_8M_3+a_9M_4$," through multiplier 10. Here, the TFCI code word r(t) has been transmitted after the second Reed-Muller coding and puncturing, and "$a_6M_1+a_7M_2+a_8M_3+a_9M_4$" has been obtained by linearly combining four or less of mask codes $M_1$, $M_2$, $M_3$, $M_4$ among the basis sequences with 4 bits $a_6$, $a_7$, $a_8$, $a_9$ of the upper side of the TFCI bits in the course of encoding by the sending party. Thereafter, decoding is performed through a Fast Hadamard Transform (FHT) decoding block 11.

Subsequently, the decoded and transformed code word is converted to an OVSF code index in the index conversion block 12. The code index conversion is required to obtain the correct TFCI from the TFCI code word received because the relation between the Hadamard code index and the OVSF code index is in a base inversion (index conversion). Upon completion of code index conversion, information on the code index can be obtained. However, a priority checking block 13 is necessary because the receiving part has no information that the set to which the OVSF code used for the encoding belongs to from the two OVSF code sets that are in binary complement relations. That is, the code word used for the encoding has been selected between the two OVSF code sets that are in binary complement relations in accordance with the least significant bit ($a_0$) of the transmitter.

The output of the priority checking block 13 is stored in a storage and comparison block 14. The outputs of the priority checking block 13 is stored for all other combinations of "$a_6$, $a_7$, $a_8$, $a_9$" by repeating the procedures of above blocks. OVSF codes and a uniform code of "$a_0$, $a_1$, $a_2$, $a_3$, $a_4$, $a_5$" which has a maximum likelihood to a particular combination that of "$a_6$, $a_7$, $a_8$, $a_9$" are then selected through a comparison procedure, thereby restoring the desired TFCI information bits "$a_0$, $a_1$, $a_2$, $a_3$, $a_4$, $a_5$, $a_6$, $a_7$, $a_8$, $a_9$" ($a_0$ is LSB and $a_9$ is MSB).

FIG. 10b shows a decoder structure according to the present invention when the number of input bit of the TFCI bits of each type is less than 6.

The receiving party first decodes the TFCI code word r(t), which has been transmitted after the OVSF coding and puncturing, through an FHT decoding block 21. The decoded and transformed code word is converted to an OVSF code index in the index conversion block (not shown in the drawings). Because the relation between the Hadamard code index and the OVSF code index is a base inversion, the code index conversion described above is required to obtain correct TFCI from the TFCI code word received.

When the bit pattern suggested by the present invention is applied, the TFCI bits, which has undergone the base inversion in advance through barrel shifting, is OVSF-encoded and transmitted. Thus, unlike the decoder structure shown in FIG. 10a, the index conversion block is unnecessary. Also, when the bit pattern suggested by the present invention is applied, the OVSF coding is used. Therefore, priority checking block is unnecessary to detect the set to which the OVSF code used for the encoding belongs to from the two OVSF code sets that are in binary complement relations. The output of the FHT decoding block 21 is stored in a storage and comparison block 22, thereby restoring the desired TFCI bits "$a_0$, $a_1$, $a_2$, $a_3$, $a_4$, $a_5$."

FIG. 10c shows a decoder structure according to the present invention when the number of input bit of the TFCI bits is 6.

The receiving party first decodes the TFCI code word r(t), which has been transmitted after the first order Reed-Muller coding (bi-orthogonal coding) and puncturing, through an FHT decoding block 31. The decoded and transformed code word is converted to an OVSF code index in the index conversion block (not shown in the drawings). Because the relation between the Hadamard code index and the OVSF code index is a base inversion, the code index conversion described above is required in order to obtain correct TFCI from the TFCI code word received.

When the bit pattern suggested by the present invention is applied, the TFCI bits, which has undergone the base inversion in advance through barrel shifting, is OVSF-encoded and transmitted. Thus, unlike the decoder structure shown in FIG. 10a, the index conversion block is also unnecessary. However, a priority checking block 32 is implemented to determine which OVSF code was used for encoding between the two OVSF code sets that are in binary complement relations. The reason is because either one of the two OVSF code sets that are in binary complement relations is selected by the sending party according to the bit value of $a_0$, which is the LSB. The output of the priority checking block 32 is stored in a storage and comparison block 33, thereby restoring the desired TFCI bits "$a_0$, $a_1$, $a_2$, $a_3$, $a_4$, $a_5$."

A mechanism of TFCI encoding procedure and decoding procedure according to the present invention will be described below. Namely, priority checking is not required when the number of input bits of the TFCI bits of each type suggested by the present invention is less than 6 as shown in FIG. 10, and no index conversion is required when the number of input bits of the TFCI bits of the present invention is less than 6 as shown in FIG. 10b. From the mathematical perspective, the OVSF code can be classified into codes generated by Rademacher function Rn(t) defined by Equation 5, where $R_0(t)=1$.

$$R_n(t) = \text{sgn}(\sin 2^n \pi t) \quad \text{[Equation 5]}$$

where, $t \in (0, T)$ $n = 1, 2, Y., \log_2 N = K$ $\text{sgn}(x) = (-1, \text{ for } x < 0)(0, \text{ for } x = 0)(1, \text{ for } x > 0)$ Thereafter, "1" is mapped to "0," while "−1" is mapped to "1." The Walsh code having a bit length of 32 bits generated by the Rademacher function is then proved to be identical to the OVSF code as expressed by Equation 6.

R1=C32,1=0000 0000 0000 0000 1111 1111 1111 1111

R2=C32,2=0000 0000 1111 1111 0000 0000 1111 1111

R3=C32,4=0000 1111 0000 1111 0000 1111 0000 1111

R4=C32,8=0011 0011 0011 0011 0011 0011 0011 0011

R5=C32,16=0101 0101 0101 0101 0101 0101 0101 0101 [Equation 6]

Here, the code having a bit length of 32 bits generated by the Rademacher function and a code generated by the Hadamard function are in base inversion (i.e. index conversion) relations as expressed by Equation 7.

R1=H5,16,

R2=H5,8,

R3=H5,4,

R4=H5,2,

R5=H5,1 [Equation 7]

Accordingly, the OVSF code and the Hadamard code are in base inversion relations as expressed by Equation 8.

$$C_{32,i}(X1,X2,X3,X4,X5)2 = H5_i(X5,X4,X3,X3,X1)2 \quad \text{[Equation 8]}$$

In short, index conversion must be performed when decoding the conventional TFCI bits through FHT after encoding and transmitting the TFCI bits as suggested by the present invention through FHT after encoding. However, when TFCI encoding and transmitting the barrel-shifted bit pattern, in advance, as in the present invention, the receiving party need not perform the index conversion.

Moreover, the present invention can be implemented by changing the matrix of base sequences of TFCI encoder.

The first method to build a matrix according to the present invention is to shift the construction of the basis sequences linearly combined with the conventional TFCI bit patterns while maintaining the prior patterns of the input TFCI bits as shown in Table 4 below.

TABLE 4

| Uniform code | ▲ | $C_{32,16}$ |
|---|---|---|
| $C_{32,1}$ | | $C_{32,8}$ |
| $C_{32,2}$ | | $C_{32,4}$ |
| $C_{32,4}$ | | $C_{32,2}$ |
| $C_{32,8}$ | | $C_{32,1}$ |
| $C_{32,16}$ | | Uniform code |
| Mask1 | | Mask1 |
| Mask2 | | Mask2 |
| Mask3 | | Mask3 |
| Mask4 | | Mask4 |

The second method is to apply the Hadamard code, which is in index conversion relations with the OVSF code index rather than the OVSF code, of the basis sequences linearly combined with the prior TFCI bits patterns while maintaining the prior patterns of the input TFCI bits, and to shift the basis sequences as shown in Table 5 below.

TABLE 5

| Uniform code | > | $H_{5,1}$ |
|---|---|---|
| $C_{32,1}$ | | $H_{5,2}$ |
| $C_{32,2}$ | | $H_{5,4}$ |
| $C_{32,4}$ | | $H_{5,8}$ |
| $C_{32,8}$ | | $H_{5,16}$ |
| $C_{32,16}$ | | Uniform code |
| Mask1 | | Mask1 |
| Mask2 | | Mask2 |
| Mask3 | | Mask3 |
| Mask4 | | Mask4 |

In addition, the present invention further utilizes the method of linearly combining $a_0$ with uniform codes of all 1's as in the conventional method, instead of applying the pattern as shown in FIG. 6 when the number of bits of the TFCI input for encoding is 1, as well as the method of linearly combining the bit patterns of each type as shown in FIG. 6 in other cases, i.e. when the number of bits of the TFCI bits input for encoding is greater than 2.

Figure 11:
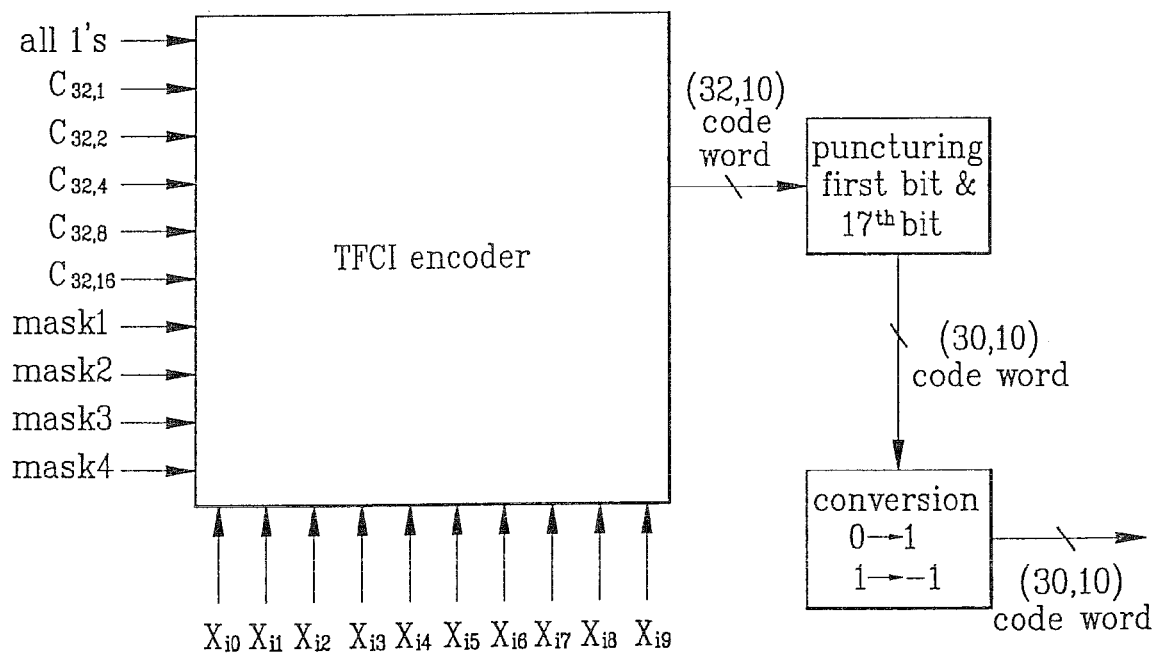
FIG. 11 is a diagram illustrating a structure of the TFCI encoder according to a first embodiment of the present invention.
Figure 12:
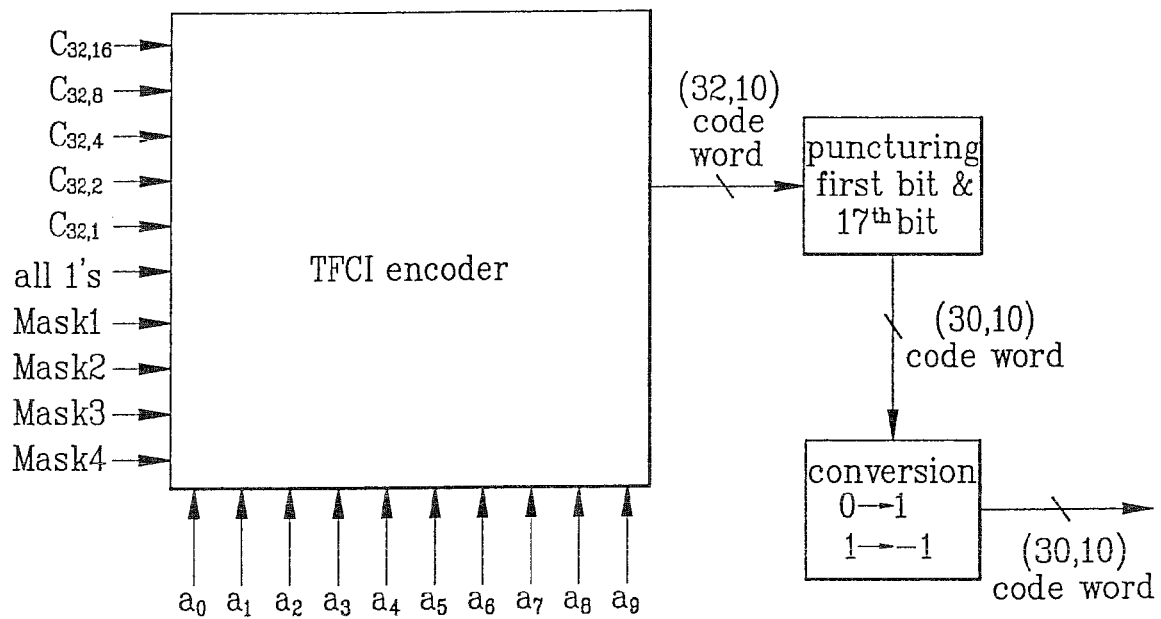
FIG. 12 is a diagram illustrating a structure of the TFCI encoder according to a second embodiment of the present invention.

FIG. 11 is a structure of a transmitting party of the TFCI according to a first embodiment of the present invention while FIG. 12 shows a structure of the TFCI transmitting party according to the second embodiment of the present invention.

Particularly, FIG. 11 shows a hardware construction for encoding and transmitting the TFCI, to which the bit pattern of FIG. 6 is applicable. In contrast, FIG. 12 shows different arrangements of the ten basis sequences linearly combined with the input data bit, while inputting the prior TFCI bits patterns as they are. In other words, FIG. 12 shows a barrel shifting of the symbol codes having all bit values of "1" except the four mask codes (Mask1, Mask2, Mask3, Mask4) among the basis sequences used for linear combination as well as five OVSF codes (C32,1, C32,2, C32,4, C32,8, C32,16), and linearly combining the same with the input data bit.

Referring to FIG. 11, the TFCI bits patterns input to the TFCI encoder can be expressed by Equation 4 described above. According to the TFCI bits patterns and basis sequences patterns applicable to each TFCI encoder in FIGS. 11 and 12, the following coding is performed in the TFCI encoder with respect to each input as explained with reference to FIG. 8.

First, the OVSF coding is performed when the number of bits of the TFCI bits determined by the upper layer is less than 6. Second, the bi-orthogonal coding, which is the first order Reed-Muller coding, is performed when the number of the TFCI bits determined by the upper layer signalling is 6. Third, the second order Reed-Muller coding is performed when the number of bits of the TFCI bits determined by the upper layer is greater than 6.

The code word of 32 bit length generated by coding in accordance with the input bit numbers of each TFCI bits becomes a code word of 30 bit length after the first and the $17^{th}$ bits are punctured. The code word is once again converted and transmitted. The receiving party then decodes the converted and transmitted code word. The bit of "0" is converted to "1," and the bit of "1" is converted to "−1" in the punctured code word of 30 bit length.

A decoding structure of the receiving party, corresponding to TFCI encoder shown in FIGS. 11 and 12, will be described with reference to FIG. 13. The decoding procedure of the TFCI code word by the receiving party will be described thereafter.

Figure 13:
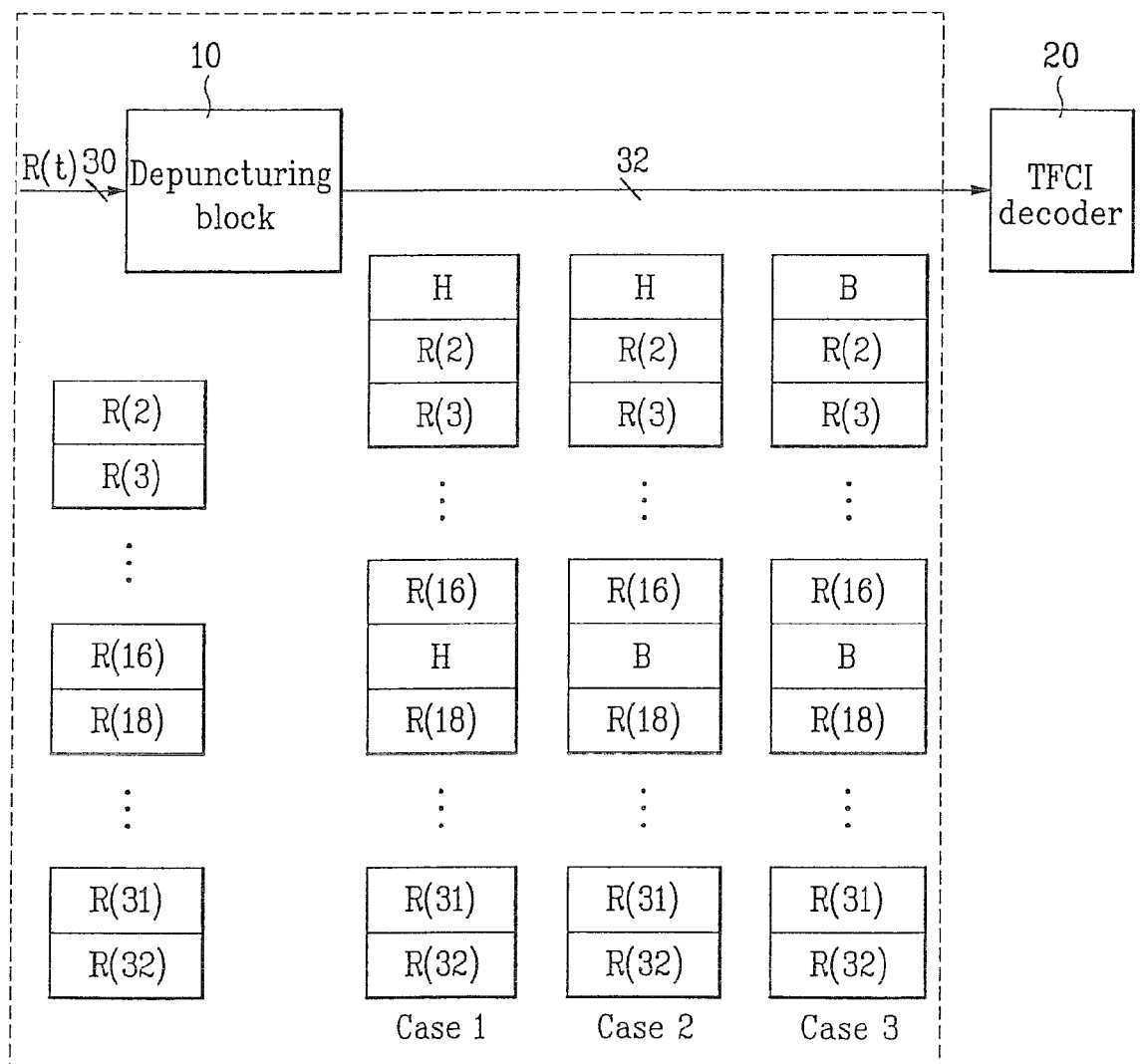
FIG. 13 is a block diagram illustrating a TFCI decoding procedure according to the present invention.

FIG. 13 is a block diagram illustrating an optimal TFCI decoding procedure according to the present invention. Referring to FIG. 13, the receiving party is unable to know whether the first and the $17^{th}$ bits of the code word of 32 bit length punctured by the sending party had a bit value of "1" or "0." Thus, according to the method in the related art, a code word of 32 bit length was produced by leaving a blank bit to a corresponding order and decoding when depuncturing a code word of 30 bit length received by the receiving party.

When the hardware structure is used for TFCI reception shown in FIGS. 11 and 12 according to the present invention, the encoded and transmitted code word becomes a Hadamard code if the number of input TFCI bits is less than 6. Therefore, errors resulting from decoding can be reduced. Here, the Hadamard code has the following characteristics.

First, if the number of input TFCI bits is 1 to 4, the first and the $17^{th}$ bits of the TFCI code word of 32 bit length always has a bit value of "0." Second, if the number of input TFCI bits is 5, the first bit of the TFCI code word of 32 bit length always has a bit value of "0." Therefore, the code of 30 bit length received by the receiving party according to the present invention is depunctured by using the above characteristics of Hadamard code.

Since the receiving party knows the number of input TFCI bits due to the signal processing by the upper layer, depuncturing is performed in the following three manners.

First, when the number of input TFCI bits is 1 to 4, the receiving party knows that the first and the $17^{th}$ bits punctured from the 32-bit code word by the sending party have bit values of "0," and that the bit value "0" has been mapped and transmitted to "1." Thus, the receiving party fills in the first and the $17^{th}$ bits with "H," which is a predetermined high bias value. (Case 1).

Second, when the number of input TFCI bits is 5, the receiving party knows that the first bit punctured from the 32-bit code word by the sending party has a bit value of "0," and that the bit value "0" has been mapped and transmitted to "1." Thus, the receiving party fills in the first bit with "H" for the first bit. Since the receiving party does not know whether the $17^{th}$ bit has a bit value of "1" or "0," the receiving party fills in the $17^{th}$ bit with "B," which is a blank bit. (Case 2).

Third, when the number of input TFCI bits is greater than 6, the receiving party is unable to know whether the first and the $17^{th}$ bits punctured from the 32-bit code word by the sending party had a bit value of "1" or "0." Thus, the receiving party fills in the $17^{th}$ bit with "B." (Case 3).

Accordingly, the depuncturing block 10 of FIG. 13 in the receiving party performs a depuncturing (compensating punctured bits) in accordance with the number of input TFCI bits as described above. Thereafter, the TFCI decoder 20 performs a decoding based on the depunctured 32-bit code word as an input.

Particularly, the receiving party receives the code word R(t) of 30-bit length as expressed by Equation 9.

$R(t)=[R(2)R(3) \ldots R(16)R(18) \ldots R(31)R(32)]$      [Equation 9]

The Depuncturing block 10 then performs depuncturing in accordance with the number of bits of the input TFCI bits to output a code word of 32-bit length in accordance with each case as shown in Equations 10 to 12 (Case1, Case2, Case3).

$[HR(2)R(3) \ldots R(16)HR(18) \ldots R(31)R(32)]$      [Equation 10]

$[HR(2)R(3) \ldots R(16)BR(8) \ldots R(31)R(32)]$      [Equation 11]

$[BR(2)R(3) \ldots R(16)BR(18) \ldots R(31)R(32)]$      [Equation 12]

In short, after having knowledge on the value of the bit punctured by the sending party, the receiving party produces a code word of 32-bit length by substituting the bit value for the corresponding bit position. The TFCI decoder 20 then performs a decoding based on the 32-bit length code word as an input, thereby restoring the desired TFCI bits.

A TFCI encoding method according to the present invention by changing the matrix of base sequences of TFCI encoder will now be described in more detail.

When a variable TFCI data bit ranging from a minimum of 1 bit to a maximum of 10 bits is input, the input TFCI data bit and the basis sequences linearly combined in the course of encoding is used as shown in Tables 6 and 8. Namely, Table 6 shows the basis sequences used in the (32, 10) TFCI encoding, and Table 8 shows the basis sequences used for the (16, 5) TFCI encoding.

The (32, 10) TFCI encoding process will first be described with reference to Table 6.

TABLE 6

| Invention (Conventional) | $S_{i,0}$ ($M_{i,1}$) | $S_{i,1}$ ($M_{i,2}$) | $S_{i,2}$ ($M_{i,3}$) | $S_{i,3}$ ($M_{i,4}$) | $S_{i,4}$ ($M_{i,5}$) | $S_{i,5}$ ($M_{i,0}$) | $S_{i,6}$ ($M_{i,6}$) | $S_{i,7}$ ($M_{i,7}$) | $S_{i,8}$ ($M_{i,8}$) | $S_{i,9}$ ($M_{i,9}$) |
|---|---|---|---|---|---|---|---|---|---|---|
| 0 | 1 | 0 | 0 | 0 | 0 | 1 | 0 | 0 | 0 | 0 |
| 1 | 0 | 1 | 0 | 0 | 0 | 1 | 1 | 0 | 0 | 0 |
| 2 | 1 | 1 | 0 | 0 | 0 | 1 | 0 | 0 | 0 | 1 |
| 3 | 0 | 0 | 1 | 0 | 0 | 1 | 1 | 0 | 1 | 1 |
| 4 | 1 | 0 | 1 | 0 | 0 | 1 | 0 | 0 | 0 | 1 |
| 5 | 0 | 1 | 1 | 0 | 0 | 1 | 0 | 0 | 1 | 0 |
| 6 | 1 | 1 | 1 | 0 | 0 | 1 | 0 | 1 | 0 | 0 |
| 7 | 0 | 0 | 0 | 1 | 0 | 1 | 0 | 1 | 1 | 0 |
| 8 | 1 | 0 | 0 | 1 | 0 | 1 | 1 | 1 | 1 | 0 |
| 9 | 0 | 1 | 0 | 1 | 0 | 1 | 1 | 0 | 1 | 1 |
| 10 | 1 | 1 | 0 | 1 | 0 | 1 | 0 | 0 | 1 | 1 |
| 11 | 0 | 0 | 1 | 1 | 0 | 1 | 0 | 1 | 1 | 0 |
| 12 | 1 | 0 | 1 | 1 | 0 | 1 | 0 | 1 | 0 | 1 |
| 13 | 0 | 1 | 1 | 1 | 0 | 1 | 1 | 0 | 0 | 1 |
| 14 | 1 | 1 | 1 | 1 | 0 | 1 | 1 | 1 | 1 | 1 |
| 15 | 1 | 0 | 0 | 0 | 1 | 1 | 1 | 1 | 0 | 0 |
| 16 | 0 | 1 | 0 | 0 | 1 | 1 | 1 | 1 | 0 | 1 |
| 17 | 1 | 1 | 0 | 0 | 1 | 1 | 1 | 0 | 1 | 0 |
| 18 | 0 | 0 | 1 | 0 | 1 | 1 | 0 | 1 | 1 | 1 |
| 19 | 1 | 0 | 1 | 0 | 1 | 1 | 0 | 1 | 0 | 1 |
| 20 | 0 | 1 | 1 | 0 | 1 | 1 | 0 | 0 | 1 | 1 |
| 21 | 1 | 1 | 1 | 0 | 1 | 1 | 0 | 1 | 1 | 1 |
| 22 | 0 | 0 | 0 | 1 | 1 | 1 | 0 | 1 | 0 | 0 |
| 23 | 1 | 0 | 0 | 1 | 1 | 1 | 1 | 1 | 0 | 1 |
| 24 | 0 | 1 | 0 | 1 | 1 | 1 | 1 | 0 | 1 | 0 |
| 25 | 1 | 1 | 0 | 1 | 1 | 1 | 1 | 0 | 0 | 1 |
| 26 | 0 | 0 | 1 | 1 | 1 | 1 | 0 | 0 | 1 | 0 |
| 27 | 1 | 0 | 1 | 1 | 1 | 1 | 1 | 1 | 0 | 0 |
| 28 | 0 | 1 | 1 | 1 | 1 | 1 | 1 | 1 | 1 | 0 |
| 29 | 1 | 1 | 1 | 1 | 1 | 1 | 1 | 1 | 1 | 1 |
| 30 | 0 | 0 | 0 | 0 | 0 | 1 | 0 | 0 | 0 | 0 |
| 31 | 0 | 0 | 0 | 0 | 1 | 1 | 1 | 0 | 0 | 0 |

As shown in Table 6 above, the relations between the basis sequences in Table 6 and those in Table 3 can be expressed by Equation 13.

$S_{i,j-1}=M_{i,j}$ (J=1, 2, 3, 4)

$S_{i,5}=M_{i,0}$ $S_{i,j}=M_{i,j}$ (j=6, 7, 8, 9)      [Equation 13]

where the first and the $17^{th}$ bits of $M_{i,j}$ is moved to the last two bits at $S_{i,j}$ The basis sequences linearly combined for encoding according to the present invention are applied in the following order: "Si, 0, Si, 1, Si, 2, Si, 3, Si, 4" corresponding to five OVSF codes represented by "C32, 1, C32, 2, C32, 4, C32, 8, C32, 16"; "Si,6, Si,7, Si, 8, Si, 9" corresponding to four mask codes represented by the conventional "Mask1, Mask2, Mask3, Mask4"; and "Si, 5" which is a single uniform code having all bit values of "1."

Accordingly, a conversion matrix for encoding a TFCI would include five column vectors of 32 elements of binary code derived from OVSF codes which are to be multiplied to lower bits of the TFCI, one column vector of 32 elements of 1, and four column vectors of 32 elements of binary code derived from mask codes which are to be multiplied to upper bits of the TFCI. Here, the five column vectors are derived by moving a first element and a $17^{th}$ element of a normal 32 element OVSF code vectors to last two positions of the OVSF code vectors, as will be described in detail below. Also, a column vector of the five column vectors which is to be multiplied to a least significant bit of the TFCI is derived from an OVSF code which alternates bits, element by element.

Figure 14:
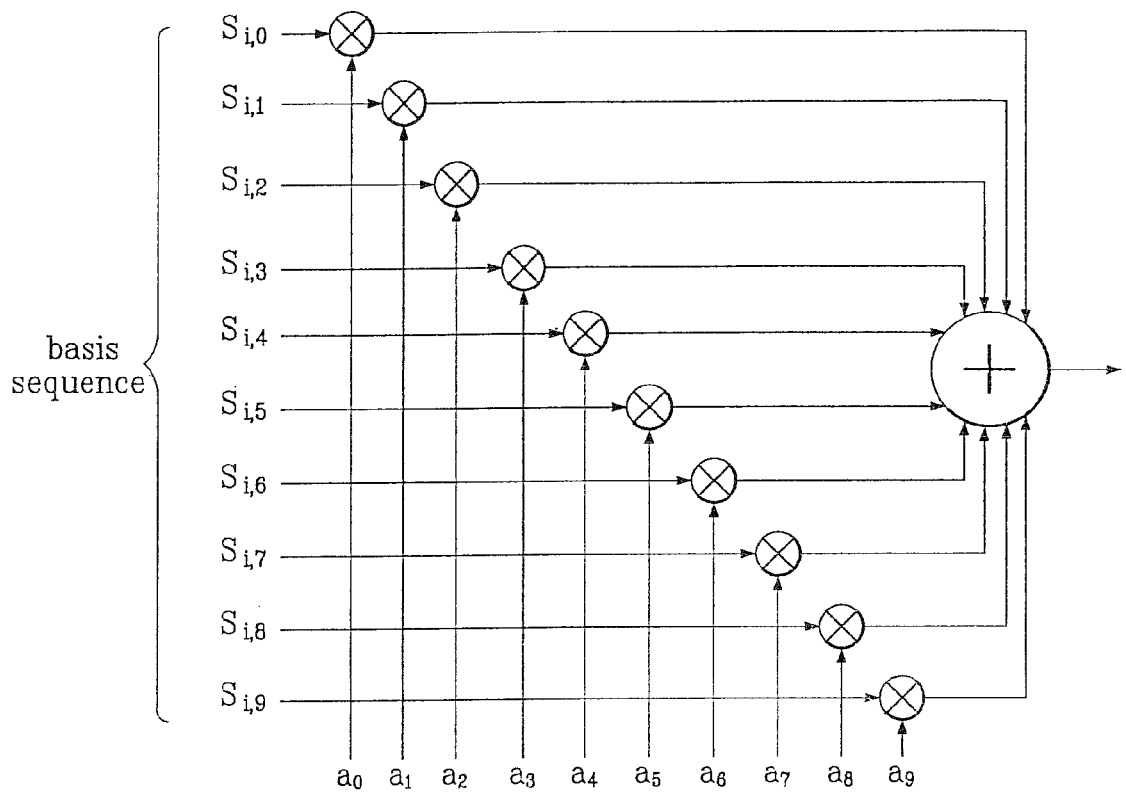
FIG. 14 is a diagram illustrating a structure of a (32, 10) TFCI encoder according to the present invention.

FIG. 14 is a diagram illustrating a structure of the (32, 10) TFCI encoder according to the present invention. Referring to FIG. 14, encoding is performed according to the present invention using Equations 14 to output a (32, 10) code word when the TFCI data bits (az=a9a8, a7 ... a1a0) are input to the (32, 10) TFCI encoder.

$$bi = \Sigma(a_n HS_{i,n}) \bmod 2 \text{ (where, n=0 to 9)} \quad \text{[Equation 14]}$$

In Equations 14, i=0, 2, . . . , 31. Also, the Equation 14 is applicable when TFCI data bit index Z is "$0 \leq Z \leq 8$," while the uniform code is applicable when TFCI data bit index Z is "9," i.e. only one TFCI bit is input. Accordingly, in the present method for transmitting the TFCI, the TFCI is coded by multiplying with the conversion matrix as describe above if the number of input TFCI bits are more than two or by repeating the input TFCI bit if the number of input TFCI is one bit.

The TFCI code word encoded as described above is divided into fifteen double bits and inserted into each time slot for transmission, and thus the entire length thereof is fixed to be 30 bits. Accordingly, the encoded 32-bit length TFCI code word is punctured by 2 bits and inserted into each time slot. According to the prior specification of 3GPP standard, the $1^{st}$ and $17^{th}$ bits of (32,10) sub-code of second order Reed-Muller code word are punctured into (30,10) code word. The following shows the $1^{st}$ and $17^{th}$ bits of Hadamard codes of length 32.

|  | $1^{st}$ bit | $17^{th}$ bit |
|---|---|---|
| $H_0$ | 0 | 0 |
| $H_1$ | 0 | 0 |
| . | . | . |
| . | . | . |
| . | . | . |
| $H_{15}$ | 0 | 0 |
| $H_{16}$ | 0 | 1 |
| $H_{17}$ | 0 | 1 |
| . | . | . |
| . | . | . |
| . | . | . |
| $H_{31}$ | 0 | 1 |

When Z equals 5, the $1^{st}$ bit of TFCI code word always becomes '0.' Similarly, when Z is greater than 5, the $1^{st}$ and $17^{th}$ bits of code word always become '0.' This implies that the receiver exactly knows the $1^{st}$ and $17^{th}$ bits when the number of zeros padded to the TFCI encoder is larger than 5, and knows the $1^{st}$ bit when the number of zeros padded is 5. This interesting property allows a performance gain as well as hardware flexibility at the side of a TFCI decoder since a gain can be obtained simply by inserting the known punctured bit or bits at the side of receiver without changing the (32,10) TFCI decoder.

The present method punctures the last $31^{st}$ bit and the $32^{nd}$ bit among the 32-bit length TFCI code word, since the basis sequences had been rearranged to move the first bit to the $31^{st}$ bit and the $17^{th}$ to the $32^{nd}$ bit. In the conventional method in which basis sequence is not rearranged, the code bit having a value of "1" is punctured. However, in the present invention, no code bit having a value of "1" is punctured when the input TFCI data bit is ranged from $a_0$ to $a_8$ since the last 2 bits are punctured among the 32-bit length TFCI word. Therefore, a maximized minimum hamming distance is gained.

A (16, 5) TFCI encoding process will now be explained with reference to Table 7 below, which shows basis sequences used for the (16, 5) TFCI encoding process according to the present invention.

TABLE 7

|  | Conventional | | | | | Present invention | | | | |
|---|---|---|---|---|---|---|---|---|---|---|
| i | $M_{i,0}$ | $M_{i,1}$ | $M_{i,2}$ | $M_{i,3}$ | $M_{i,4}$ | $S_{i,0}$ | $S_{i,1}$ | $S_{i,2}$ | $S_{i,3}$ | $S_{i,4}$ |
| 0 | 1 | 0 | 0 | 0 | 0 | 1 | 0 | 0 | 0 | 1 |
| 1 | 1 | 1 | 0 | 0 | 0 | 0 | 1 | 0 | 0 | 1 |
| 2 | 1 | 0 | 1 | 0 | 0 | 1 | 1 | 0 | 0 | 1 |
| 3 | 1 | 1 | 1 | 0 | 0 | 0 | 0 | 1 | 0 | 1 |
| 4 | 1 | 0 | 0 | 1 | 0 | 1 | 0 | 1 | 0 | 1 |
| 5 | 1 | 1 | 0 | 1 | 0 | 0 | 1 | 1 | 0 | 1 |
| 6 | 1 | 0 | 1 | 1 | 0 | 1 | 1 | 1 | 0 | 1 |
| 7 | 1 | 1 | 1 | 1 | 0 | 0 | 0 | 0 | 1 | 1 |
| 8 | 1 | 0 | 0 | 0 | 1 | 1 | 0 | 0 | 1 | 1 |
| 9 | 1 | 1 | 0 | 0 | 1 | 0 | 1 | 0 | 1 | 1 |
| 10 | 1 | 0 | 1 | 0 | 1 | 1 | 1 | 0 | 1 | 1 |
| 11 | 1 | 1 | 1 | 0 | 1 | 0 | 0 | 1 | 1 | 1 |
| 12 | 1 | 0 | 0 | 1 | 1 | 1 | 0 | 1 | 1 | 1 |
| 13 | 1 | 1 | 0 | 1 | 1 | 0 | 1 | 1 | 1 | 1 |
| 14 | 1 | 0 | 1 | 1 | 1 | 1 | 1 | 1 | 1 | 1 |
| 15 | 1 | 1 | 1 | 1 | 1 | 0 | 0 | 0 | 0 | 1 |

As shown in Table 8, the relations between the basis sequences according to the conventional art and those according to the present invention can be expressed by Equation 15.

$$S_{i-1,j-1} = M_{i,j} \text{ (i=1, 14, 15) (j=1, 2, 3, 4)}$$

$$S_{15,j-1} = M_{1,j} \text{ (j=1, 2, 3, 4)}$$

$$S_{i,4} = M_{i,0} \quad \text{[Equation 15]}$$

The basis sequences linearly combined for encoding, which are applicable according to the present invention, are "Si,0, Si,1, Si,2, Si,3, Si,4" corresponding to five OVSF codes expressed as "C32,1, C32,3, C32,4, C32,8, C32,16" from the top under the conventional art.

Thus, a conversion matrix for encoding the TFCI includes four column vectors of 16 elements of binary code derived from codes orthogonal to one another which are to be multiplied to the lower bits of the TFCI and one column vector of 16 elements of 1. Also, as will be described below, the four column vectors are derived by moving a first element of normal 16 element orthogonal code vectors to last positions of the orthogonal code vectors, and a column vector of the four column vectors which is to be multiplied to a least significant bit of the TFCI is made from an orthogonal code which alternates bits, element by element.

Figure 15:
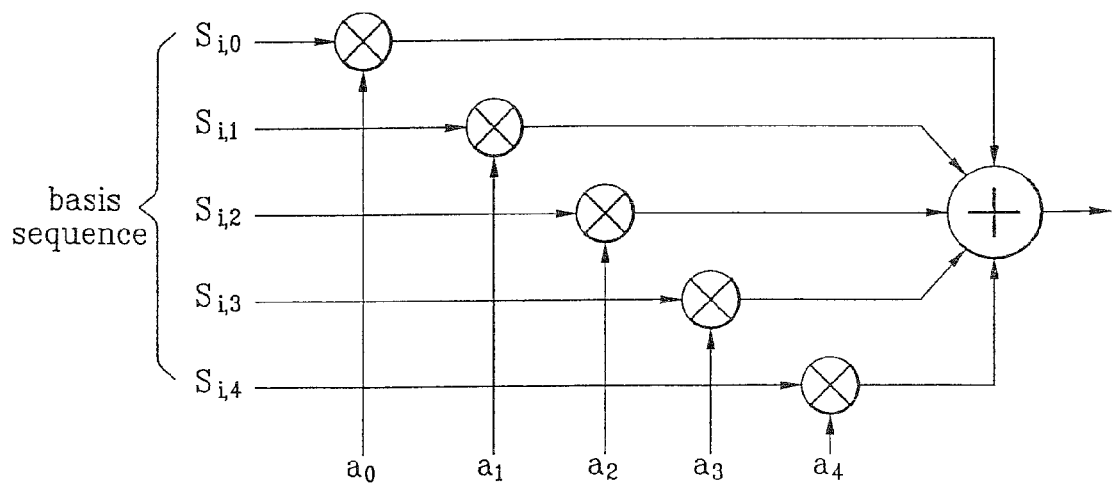
FIG. 15 is a diagram illustrating a structure of a (16, 5) TFCI encoder for split mode according to the present invention.

FIG. 15 is a diagram illustrating a structure of the (16, 5) TFCI encoder according to the present invention. Referring to FIG. 15, when the TFCI data bits ($a_z = a_4, \ldots a_1, a_0$) are input to a (16, 5) encoder, encoding is performed using Equation 16 according to the present invention.

$$bi = \Sigma(a_n \times S_{i,n}) \bmod 2 \text{ (where, n=0 to 4)} \quad \text{[Equation 16]}$$

In Equation 16, i=0, 2, . . . 15. Equation 16 is applicable when the TFCI data bit index Z is "0≦Z≦3." If the TFCI consist of 1 bit, that is "Z=4," repetition is used for coding. Namely, $a_0$ is repeated 16 times for $b_i$.

The (16, 5) TFCI code word encoded as described above is divided into 1 bit each, inserted into each time slot, and transmitted. Because the entire length is fixed to 15 bits, the encoded TFCI code word of 16 bit length is punctured for 1 bit, and inserted into each time slot. Here, the last $16^{th}$ bit among the TFCI code word of 16 bit length is punctured.

The encoding procedure as described above can also be used for split mode. In case of DCH in a Split Mode, the UTRAN operates as follows. If one of the links is associated with a DSCH, the TFCI code word may be split in such a way that the code word relevant for TFCI activity indication is not transmitted from every cell. The use of such a functionality shall be indicated by higher layer signalling.

Figure 16:
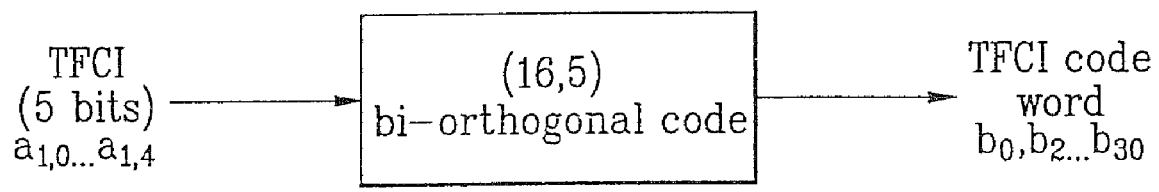
FIG. 16 is a block diagram illustrating a structure of twin (16, 5) TFCI encoder for split mode according to the present invention.
Figure 16:
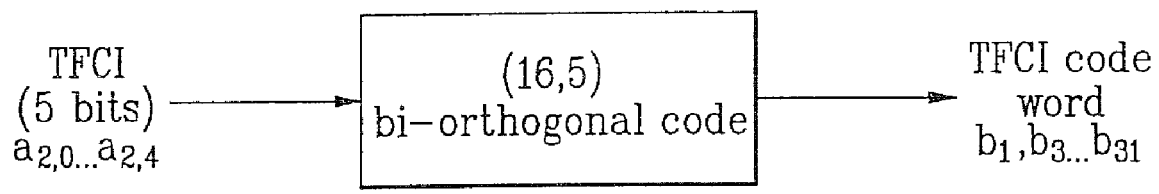

The TFCI bits are encoded using a (16, 5) bi-orthogonal (or first order Reed-Muller) code. The coding procedure is as shown in FIG. 16.

$$b2i = \Sigma(a_{1,n} \times S_{i,n}) \bmod 2 \text{ (where, n=0 to 4)}$$

$$b2i+1 = \Sigma(a_{2,n} \times S_{i,n}) \bmod 2 \text{ (where, n=0 to 4)} \qquad \text{[Equation 17]}$$

In Equation 17, i=0, 2, . . . 15. Equation 17 is applicable when the TFCI data bit index Z is "0≦Z≦3." If the TFCI consist of 1 bit, that is "Z=4," repetition is used for coding. Namely, $a_{1,0}$ is repeated 16 times for $b_{2i}$ and $a_{2,0}$ is repeated 16 times for $b_{2i+1}$. Accordingly, in the present method for transmitting the TFCI, the TFCI bits are coded by multiplying a conversion matrix as described above if the number of TFCI bits are more than two or by repeating the TFCI bit if the number of TFCI is one bit.

As described above, the present invention has the following advantageous effects.

First, the receiving party can decode an encoded and transmitted TFCI code word through a more simple procedure using an optimal TFCI encoding method. Second, when the number of bits of the input TFCI bits is less than 6, the receiving party performs depuncturing by substituting a high bias value for the bit position punctured by the sending party. The receiving party therefore is able to know the encoded code word, and may undergo a more simple procedure in decoding the transmitted code word. As a result, the hardware required can also be reduced, thereby reducing the cost. Moreover, a maximized minimum hamming distance is gained with respect to the TFCI code word when inserting and transmitting the TFCI code word by 1 bit or 2 bits per time slot after puncturing the TFCI code word. The minimum hamming distance is thus maximized with respect to the TFCI code word and the performance of the entire system is enhanced.

The foregoing embodiments are merely exemplary and are not to be construed as limiting the present invention. The present teachings can be readily applied to other types of apparatuses. The description of the present invention is intended to be illustrative, and not to limit the scope of the claims. Many alternatives, modifications, and variations will be apparent to those skilled in the art.

What is claimed is:

1. A method for a transmitting side to transmit signals using a (32, 10) block coding to a receiving side in a mobile communication system, the method comprising:

encoding input information bits consists of 10 bits ($a_9$, . . . $a_0$) using 10 basis sequences each having 32-bit length ($M_{i,0}$, $M_{i,1}$, $M_{i,2}$, $M_{i,3}$, $M_{i,4}$, $M_{i,5}$, $M_{i,6}$, $M_{i,7}$, $M_{i,8}$ and $M_{i,9}$) to output bits having 32-bit length ($b_i$), (i)=0, . . . , 31; and transmitting first 30 bits of the ($b_i$) among the 32-bit length ($b_i$) through a physical channel transmitting the first 30 bits for a radio frame, wherein the 10 basis sequences ($M_{i,0}$, $M_{i,1}$, $M_{i,2}$, $M_{i,3}$, $M_{i,4}$, $M_{i,5}$, $M_{i,6}$, $M_{i,7}$, $M_{i,8}$ and $M_{i,9}$) are defined as:

| i | $M_{i,0}$ | $M_{i,1}$ | $M_{i,2}$ | $M_{i,3}$ | $M_{i,4}$ | $M_{i,5}$ | $M_{i,6}$ | $M_{i,7}$ | $M_{i,8}$ | $M_{i,9}$ |
|---|---|---|---|---|---|---|---|---|---|---|
| 0 | 1 | 0 | 0 | 0 | 0 | 1 | 0 | 0 | 0 | 0 |
| 1 | 0 | 1 | 0 | 0 | 0 | 1 | 1 | 0 | 0 | 0 |
| 2 | 1 | 1 | 0 | 0 | 0 | 1 | 0 | 0 | 0 | 1 |
| 3 | 0 | 0 | 1 | 0 | 0 | 1 | 1 | 0 | 1 | 1 |
| 4 | 1 | 0 | 1 | 0 | 0 | 1 | 0 | 0 | 0 | 1 |
| 5 | 0 | 1 | 1 | 0 | 0 | 1 | 0 | 0 | 1 | 0 |
| 6 | 1 | 1 | 1 | 0 | 0 | 1 | 0 | 1 | 0 | 0 |
| 7 | 0 | 0 | 0 | 1 | 0 | 1 | 0 | 1 | 1 | 0 |
| 8 | 1 | 0 | 0 | 1 | 0 | 1 | 1 | 1 | 1 | 0 |
| 9 | 0 | 1 | 0 | 1 | 0 | 1 | 1 | 0 | 1 | 1 |
| 10 | 1 | 1 | 0 | 1 | 0 | 1 | 0 | 0 | 1 | 1 |
| 11 | 0 | 0 | 1 | 1 | 0 | 1 | 0 | 1 | 1 | 0 |
| 12 | 1 | 0 | 1 | 1 | 0 | 1 | 0 | 1 | 0 | 1 |
| 13 | 0 | 1 | 1 | 1 | 0 | 1 | 1 | 0 | 0 | 1 |
| 14 | 1 | 1 | 1 | 1 | 0 | 1 | 1 | 1 | 1 | 1 |
| 15 | 1 | 0 | 0 | 0 | 1 | 1 | 1 | 1 | 0 | 0 |
| 16 | 0 | 1 | 0 | 0 | 1 | 1 | 1 | 1 | 0 | 1 |
| 17 | 1 | 1 | 0 | 0 | 1 | 1 | 1 | 0 | 1 | 0 |
| 18 | 0 | 0 | 1 | 0 | 1 | 1 | 0 | 1 | 1 | 1 |
| 19 | 1 | 0 | 1 | 0 | 1 | 1 | 0 | 1 | 0 | 1 |
| 20 | 0 | 1 | 1 | 0 | 1 | 1 | 0 | 0 | 1 | 1 |
| 21 | 1 | 1 | 1 | 0 | 1 | 1 | 0 | 1 | 1 | 1 |
| 22 | 0 | 0 | 0 | 1 | 1 | 1 | 0 | 1 | 0 | 0 |
| 23 | 1 | 0 | 0 | 1 | 1 | 1 | 1 | 1 | 0 | 1 |
| 24 | 0 | 1 | 0 | 1 | 1 | 1 | 1 | 0 | 1 | 0 |
| 25 | 1 | 1 | 0 | 1 | 1 | 1 | 1 | 0 | 0 | 1 |
| 26 | 0 | 0 | 1 | 1 | 1 | 1 | 0 | 0 | 1 | 0 |
| 27 | 1 | 0 | 1 | 1 | 1 | 1 | 1 | 1 | 0 | 0 |
| 28 | 0 | 1 | 1 | 1 | 1 | 1 | 1 | 1 | 1 | 0 |
| 29 | 1 | 1 | 1 | 1 | 1 | 1 | 1 | 1 | 1 | 1 |
| 30 | 0 | 0 | 0 | 0 | 0 | 1 | 0 | 0 | 0 | 0 |
| 31 | 0 | 0 | 0 | 0 | 1 | 1 | 1 | 0 | 0 | 0 | wherein the 32-bit length ($b_i$) is defined by:

$$b_i \sum_{n=0}^{9} (a_n \times M_{i,8}) \bmod 2$$

wherein "mod 2" denotes a calculation using modulo 2.

2. The method according to claim 1, wherein transmitting the first 30 bits of the ($b_i$) among the 32-bit length ($b_i$) is performed by puncturing last 2 bits of the 32-bit length ($b_i$).

3. The method according to claim 1, wherein if a number of the input information bits is less than 10 bits, the input information bits are padded with zeros to 10 bits to form the information bits consists of 10 bits (a9, . . . a0).

4. The method according to claim 3, wherein the input information bits are padded by sequentially setting a most significant bit to zero, where ($a_0$) is a Least Significant Bit (LSB) and ($a_9$) is a Most Significant Bit (MSB).

5. The method according to claim 1, wherein the (32, 10) block coding uses a second order Reed-Muller code.

6. The method according to claim 1, wherein the input information bits are TFCI (Transport Format Combination Indicator) information bits.

* * * * *